US007750223B2

(12) United States Patent
Ohshima et al.

(10) Patent No.: US 7,750,223 B2
(45) Date of Patent: Jul. 6, 2010

(54) MUSICAL INTERACTION ASSISTING APPARATUS

(75) Inventors: Osamu Ohshima, Hamamatsu (JP); Yoshinari Nakamura, Hamamatsu (JP); Kenichi Nishida, Hamamatsu (JP); Atsushi Fukada, Hamamatsu (JP); Shinya Sakurada, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 11/475,547

(22) Filed: Jun. 27, 2006

(65) Prior Publication Data

US 2007/0039450 A1 Feb. 22, 2007

(30) Foreign Application Priority Data

Jun. 27, 2005 (JP) ............................ 2005-187139

(51) Int. Cl.
*A63H 30/00* (2006.01)
*G09B 15/00* (2006.01)

(52) U.S. Cl. .................................... 84/470 R; 446/175

(58) Field of Classification Search ................. 446/297, 446/300, 175; 434/320, 307 A, 307 R; 84/470 R; 901/1

See application file for complete search history.

(56) References Cited

U.S. PATENT DOCUMENTS 5,361,672 A 11/1994 Koyama
5,746,602 A * 5/1998 Kikinis ........................ 434/169
6,084,168 A * 7/2000 Sitrick ........................ 84/477 R
6,319,010 B1 * 11/2001 Kikinis ........................ 434/169
6,393,136 B1 * 5/2002 Amir et al. .................. 382/103
6,835,887 B2 * 12/2004 Devecka ...................... 84/743
2003/0167908 A1 9/2003 Nishitani et al.

FOREIGN PATENT DOCUMENTS

EP 1 107 227 A2 6/2001
JP 05-027753 A 2/1993
JP 05-303326 A 11/1993
JP 10-049151 A 2/1998
JP 2001-154681 A 6/2001
JP 2001327748 A * 11/2001
JP 2002-023742 A 1/2002
JP 2004-271566 A 9/2004

OTHER PUBLICATIONS

Notice of Reasons for Rejection issued in corresponding Japanese Patent Application No. 2005-187139 dated Oct. 20, 2009. Extracted English Trnaslation provided.
Notice of Reasons for Rejection issued in corresponding Japanese Patent Application No. 2005-187139 dated Jul. 28, 2009. Extracted English Translation provided.

* cited by examiner

*Primary Examiner*—Jeffrey Donels
*Assistant Examiner*—Andrew R Millikin
(74) *Attorney, Agent, or Firm*—Rossi, Kimms & McDowell LLP

(57) ABSTRACT

A musical interaction assisting apparatus is to enhance friendliness between an electronic musical instrument and the player. The player's actions are detected acoustically, visually or physically, and the interaction assisting apparatus interprets the detected player's actions and generates interactive responses thereto. The interactive responses are outputted acoustically, visually or physically for the player, and electronically to control the electronic musical instrument. The interaction assisting apparatus also has a learning function to provide proper responses to the player.

6 Claims, 2 Drawing Sheets

Functional Block Diagram of Musical Interaction Assisting Apparatus

Hardware Configuration of Electronic Musical Apparatus

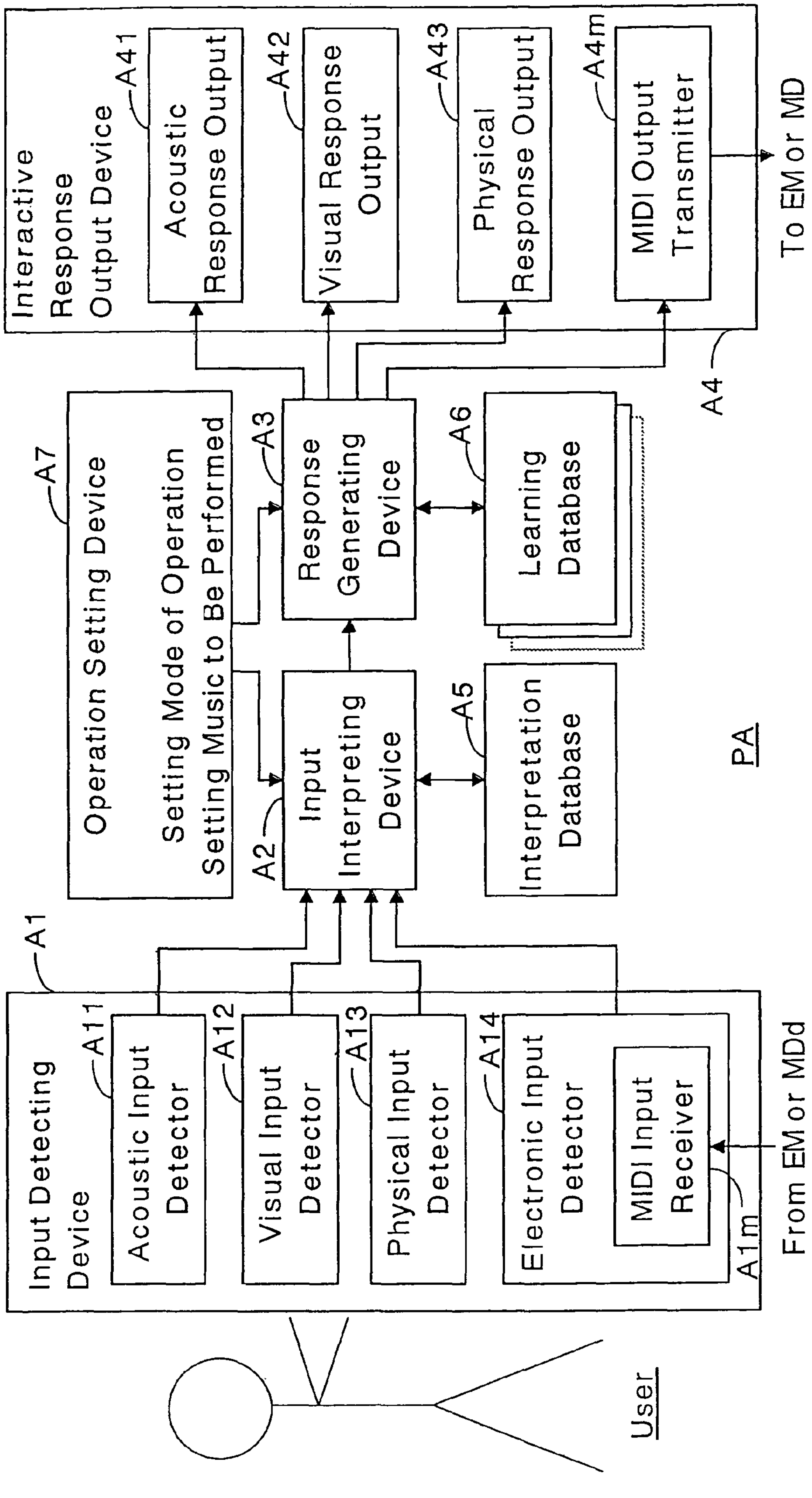
*Fig. 2* Functional Block Diagram of Musical Interaction Assisting Apparatus

MUSICAL INTERACTION ASSISTING APPARATUS

TECHNICAL FIELD

The present invention relates to a musical interaction assisting apparatus, and more particularly to a musical interaction assisting apparatus to be operatively connected to an electronic musical apparatus and to enhance friendliness between the electronic musical apparatus and the player, and a computer readable medium containing program instructions for realizing such a musical interaction assisting function, in which various actions of the player are detected and corresponding responses will be given back to the player with the electronic musical apparatus being controlled accordingly.

BACKGROUND INFORMATION

For assisting a user of an electronic musical apparatus such as an electronic musical instrument to play or operate the apparatus, there have been known in the art various types of help functions incorporated in the apparatus to facilitate how to handle the apparatus. For example, U.S. Pat. No. 5,361,672 (corresponding to unexamined Japanese patent publication No. H5-27753) discloses an electronic musical instrument having a help mode in which the manipulation of a control switch together with a help switch being kept activated will show the user on a display device the function assigned to the manipulated control switch. Such a help function, however, may assist the user to some extent mechanically, but will not give a friendly interactive response to the user.

On the other hand, there have been developed and put to use various interactive robots such as pet robots like those imitating dogs and housework robots like those for cleaning rooms in reaction to human being's call or touch and operating in a friendly interactive manner.

SUMMARY OF THE INVENTION

It is, therefore, a primary object of the present invention to provide a musical interaction assisting apparatus which is to be operatively connected to an electronic musical instrument or apparatus and operates interactively so that the user or player of the electronic musical instrument or apparatus will feel friendliness in keeping interaction with this assisting apparatus and the electronic musical instrument or apparatus while playing and enjoying music.

According to the present invention, the object is accomplished by providing a musical interaction assisting apparatus to be operatively connected to an electronic musical apparatus comprising: an input device for inputting action information representing user's actions acoustically, visually and/or physically; an interpreting device for interpreting the action information inputted via the input device to provide an interpretation result; a response generating device for generating interactive response signals based on the interpretation result; and an interactive response output device for outputting an electronic response signal for controlling the electronic musical apparatus and an acoustic, a visual and/or a physical interactive response.

In an aspect of the present invention, the input device may include a receiver which receives performance information representing a user's performance on the electronic musical apparatus; and the response generating device may include a learning device which learns from the inputted action information and/or the performance information to generate the interactive response signals reflecting the learned result. The interpreting device will then interprets the inputted user's performance and actions (acoustic, visual and/or physical) to grasp intended meanings of the inputted performance and actions, and the learning device will learn from the interpreted results the tendencies and the patterns of the user's manipulations, and as a result proper responses will be given out to the user and the musical apparatus reflecting the user's performances and meeting the user's expectation. Thus, the musical interaction assisting apparatus and the electronic musical apparatus will be friendly to the user.

In another aspect of the present invention, the musical interaction assisting apparatus may be of a robot type. In addition, the interactive response output device may output the visual interactive response by spatially moving the robot type musical interaction assisting apparatus. Further, the interactive response output device may output the physical interactive response in a way of touching the user and/or vibrating itself.

In still another aspect of the present invention, the musical interaction assisting apparatus may be incorporated in the electronic musical apparatus. In addition, the interactive response output device may include a display device having a display panel for displaying an image as the visual response.

In a further aspect of the present invention, the input device may include a camera for visually detecting the action information; and the interpreting device may interpret the visually detected action information as an eye movement, a behavior, a facial expression and/or a gesture of the user.

In a still further aspect of the present invention, the input device may include a microphone for acoustically detecting the action information; and the interpreting device may interpret the acoustically detected action information as a language, a music, a call and/or a noise.

In a still further aspect of the present invention, the input device may include a sensor for physically detecting the action information; and the interpreting device may interpret the physically detected action information as a touch, a wag, a clap and/or a lift.

In a still further aspect of the present invention, the interactive response output device may include a loudspeaker and may output the acoustic interactive response by emitting voices and/or musical sounds from the loudspeaker.

In a still further aspect of the present invention, the interactive response output device may include a temperature controlling module and may output the physical interactive response by controlling the temperature of the musical interaction assisting apparatus using the temperature controlling module.

In a still further aspect of the present invention, the interactive response output device may output a prompt for the user to input a further action subsequent to the previously inputted action information.

According to the present invention, the object is further accomplished by providing a computer readable medium for use in a computer being connectable to an electronic musical apparatus and associated with an input device for inputting action information representing user's actions acoustically, visually and/or physically, the medium containing program instructions executable by the computer for causing the computer to execute: a process of interpreting the action information inputted via the input device to provide an interpretation result; a process of generating interactive response signals based on the interpretation result; and a process of outputting an electronic response signal for controlling the electronic musical apparatus and an acoustic, a visual and/or a physical interactive response. Thus, the computer program will realize a musical interaction assisting apparatus as described above.

With the musical interaction assisting apparatus according to the present invention, the acoustic information may be given by words or musical sounds, the visual information may be given by eye movements or gestures, and the physical information may be given by heat or touches or vibrations. The given information will be interpreted and then interactive responses will be given out by controlling the electronic musical apparatus or telling the user. The acoustic output may be given by synthesized voices or musical tones, the visual output may be given by images on the display panel or by movement of the robot body, and the physical output may be given by touching the user. Thus, the user can interact with the apparatus in a friendly relationship.

As will be apparent from the above description, the present invention can be practiced not only in the form of an apparatus, but also in the form of a computer program to operate a computer or other data processing devices. The invention can further be practiced in the form of a method including the steps mentioned herein.

In addition, as will be apparent from the description herein later, some of the structural element devices of the present invention are structured by means of hardware circuits, while some are configured by a computer system performing the assigned functions according to the associated programs. The former may of course be configured by a computer system and the latter may of course be hardware structured discrete devices. Therefore, a hardware-structured device performing a certain function and a computer-configured arrangement performing the same function should be considered a same-named device or an equivalent to the other.

BRIEF DESCRIPTION OF THE DRAWINGS

For a better understanding of the present invention, and to show how the same may be practiced and will work, reference will now be made, by way of example, to the accompanying drawings, in which:

FIG. 2 is a functional block diagram of a musical interaction assisting apparatus according to an embodiment of the present invention.

DETAILED DESCRIPTION OF EMBODIMENTS OF THE INVENTION

Figure 1:
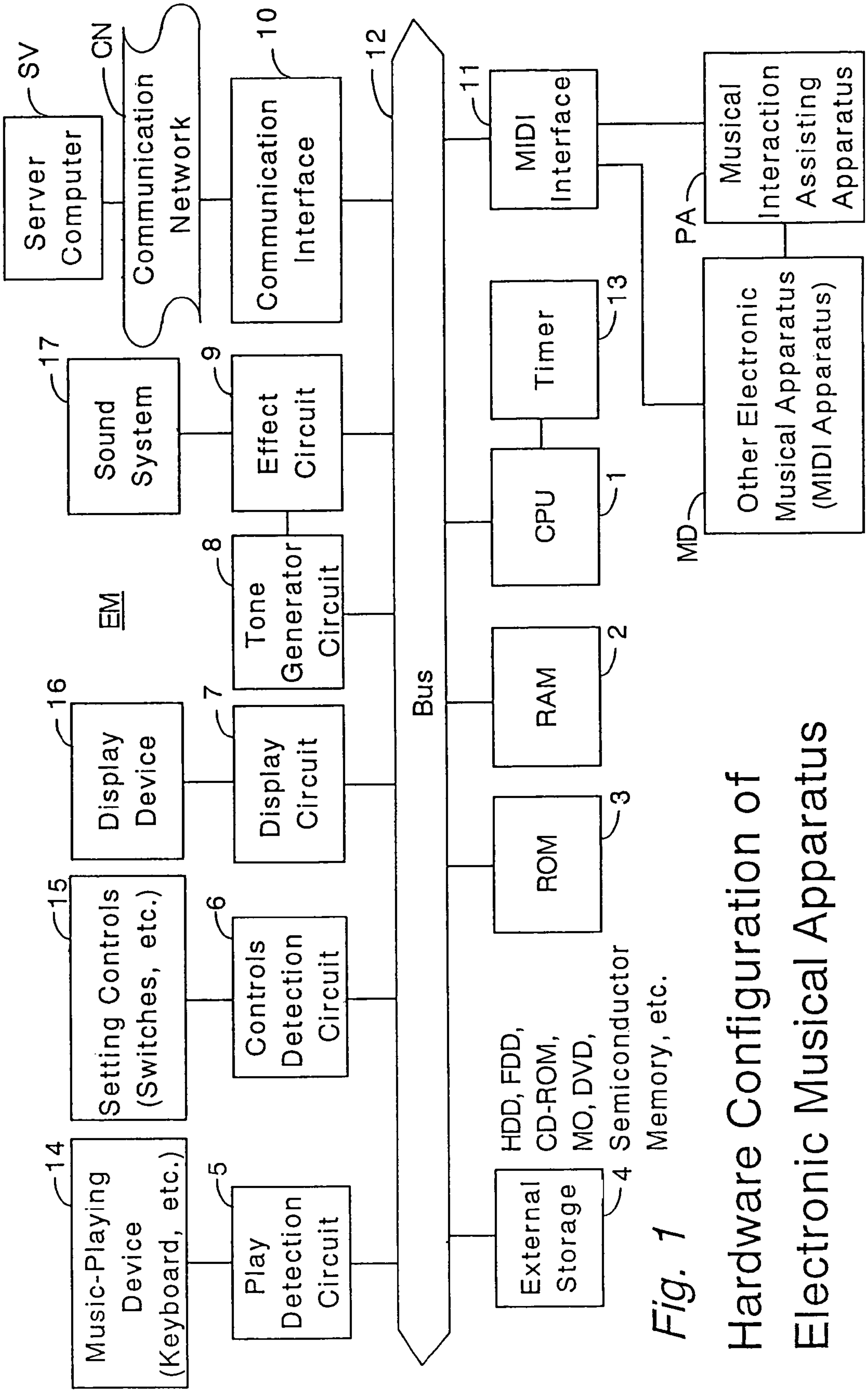
FIG. 1 is a block diagram illustrating the overall hardware configuration of an electronic musical apparatus connected with a musical interaction assisting apparatus according to an embodiment of the present invention.

The present invention will now be described in detail with reference to the drawings showing preferred embodiments thereof It should, however, be understood that the illustrated embodiments are merely examples for the purpose of understanding the invention, and should not be taken as limiting the scope of the invention.

Overall Configuration of Electronic Musical Apparatus

FIG. 1 shows a block diagram illustrating the overall hardware configuration of an electronic musical apparatus connected with a musical interaction assisting apparatus according to an embodiment of the present invention. The electronic musical apparatus EM may be a keyboard type electronic musical instrument or a personal computer (PC) equipped with a music-playing device and a tone generating device to make a musical data processing apparatus having a similar function as an electronic musical instrument. The electronic musical apparatus EM comprises a central processing unit (CPU) 1, a random access memory (RAM) 2, a read-only memory (ROM) 3, an external storage device 4, a play detection circuit 5, a controls detection circuit 6, a display circuit 7, a tone generator circuit 8, an effect circuit 9, a communication interface 10 and a MIDI interface 11, all of which are connected with each other by a system bus 12.

The CPU 1 conducts various music data processing as operated on the clock pulses from a timer 13. The RAM 2 is used as work areas for temporarily storing various data necessary for the processing. The ROM 3 stores beforehand various control programs, control data, performance data, and so forth necessary to execute the processing.

The external storage device 4 may include a built-in storage medium such as a hard disk (HD) as well as various portable external storage media such as a compact disk read-only memory (CD-ROM), a flexible disk (FD), a magneto-optical (MO) disk, a digital versatile disk (DVD), a semiconductor (SC) memory such as a small-sized memory card like Smart Media (trademark) and so forth. Any of these storage media of such external storage device 4 are available for storing any data necessary for the processing.

The play detection circuit 5 is connected to a music-playing device 14 such as a keyboard to constitute in combination a music-playing unit, and detects the user's operations of a music-playing device 14 for a musical performance and introduces data representing the musical performance into the musical apparatus EM. The controls detection circuit 6 is connected to setting controls 15 including switches on a control panel and a mouse device to constitute in combination a setting panel unit, and detects the user's operations of the setting controls 15 and introduces data representing such user's operations on the panel into the musical apparatus EM. The display circuit 7 is connected to a display device 16 such as an LCD for displaying various screen images and pictures and to various indicators (not shown), if any, and controls the displayed or indicated contents and lighting conditions of these devices according to instructions from the CPU 1 to assist the user in operating the music-playing device 14 and the setting controls 15.

The tone generator circuit 8 generates musical tone signals according to the real-time performance data from the music-playing device 14 and the setting controls 15 and/or the performance data read out from the external storage 4 or the ROM 3. The effect circuit 9 includes an effect imparting DSP (digital signal processor) and imparts intended tone effects to the musical tone signals outputted from the tone generator circuit 8. The tone generator circuit 8 and the effect circuit 9 function as a musical tone signal producing unit and can be called in combination a tone source unit. Subsequent to the effect circuit 9 is connected a sound system 17, which includes a D/A converter, an amplifier and a loudspeaker, and emits audible sounds based on the effect imparted musical tone signals from the effect circuit 9.

The communication interface 10 is connected to a communication network CN such as the Internet and a local area network (LAN) so that control programs or musical performance data can be received or downloaded from an external server computer SV or the like to be stored in the external storage 4 for later use in the electronic musical apparatus EM.

To the MIDI interface 11 is connected a musical interaction assisting apparatus of the present invention and other electronic musical apparatus MD having a similar MIDI musical data processing function as the electronic musical apparatus EM so that MIDI data are transmitted between the electronic musical apparatus EM and the musical interaction assisting apparatus PA and between the electronic musical apparatus EM and other electronic musical apparatus MD via the MIDI interface 11.

For example, the musical interaction assisting apparatus PA generates a MIDI signal incorporating various control data in the MIDI data according to various inputs from the user, which generated MIDI signal can control the electronic musical apparatus EM accordingly. When the electronic musical apparatus EM transmits a MIDI signal (user's performance signal) based on the user's musical performance on the apparatus EM, the musical interaction assisting apparatus PA will interpret the user's performance signal and will give back the user an interactive response to the user's performance and/or operations. Further, the MIDI data signals can be communicated between the electronic musical apparatus EM and other electronic musical apparatus MD so that the MIDI data can be utilized mutually for musical performances in the respective apparatuses EM and MD.

Functions of Musical Interaction Assisting Apparatus

In a musical interaction assisting apparatus PA according to an embodiment of the present invention, action information which represents the user's actions acoustically, visually and/or physically is inputted as the cause information, which in turn is interpreted to generate interactive responses, which responses are then given to the electronic musical apparatus EM such as an electronic musical instrument to control it and are also given back to the user as acoustic, visual and/or physical responses interactively. FIG. 2 shows a functional block diagram for describing the functions of a musical interaction assisting apparatus according to an embodiment of the present invention.

Referring to FIG. 2, a musical interaction assisting apparatus according to an embodiment of the present invention will be generally described as follows. In the musical interaction assisting apparatus PA, action information representing the user's actions acoustically (in terms of words or musical sounds), visually (in terms of the user's eye movements or gestures) and/or physically (in terms of heat, touch or vibration), and/or the user's performance information from the electronic musical apparatus EM are inputted through an input device A1 (including an acoustic input detector A11, a visual input detector A12, a physical input detector A13 and/or a MIDI input receiver A1*m* in an electronic input detector A14) as an income to this musical interaction assisting apparatus PA. An interpreting device A2 interprets the action information inputted via the input device A1 with reference to an interpretation database A5 and provides an interpretation result. A response generating device A3 generates interactive response signals based on the interpretation result. An interactive response output device A4 outputs, according to the generated interactive response signals, an electronic musical signal for controlling the electronic musical apparatus EM such as an electronic musical instrument via a. MIDI output transmitter A4*m*, and outputs an acoustic interactive response (e.g. words or musical sounds) from an acoustic response output A41, a visual interactive response (e.g. images or robot movements) from a visual response output A42 or a physical interactive response (e.g. temperature change or touching) from a physical response output A43 as an outcome from this musical interaction assisting apparatus PA to the user. Further, the response generating device A3 learns from the inputted user's action information or the user's musical performance information with reference to a learning database A6, and interprets the subsequently inputted action information properly in view of the learned results to generate proper responses.

Description will be made in more detail hereinafter. The musical interaction assisting apparatus PA is a kind of computer comprising data processing hardware including a CPU, a timer, a RAM, etc., data storing hardware including a ROM, an external storage, etc., and interfaces for network connection including a MIDI interface, and is further equipped with various input devices for acoustic, visual, physical, electronic (including wireless) and other inputs. The musical interaction assisting apparatus PA may be in the form of a robot or another type of separate machine or may be incorporated in another (parent) apparatus. In the case of a robot or another type of separate machine, the assisting apparatus PA may be connected to the parent apparatus to configure an intended interactive system. In the case of a built-in type, the assisting apparatus PA is incorporated in the parent apparatus such as an electronic musical apparatus EM as an integral part thereof.

The musical interaction assisting apparatus PA as expressed in the functional block diagram is comprised of the input detecting block A1 performing various input functions, the interpreting block A2 and the response generating block A3 performing assigned data processing functions, and the interactive response outputting block A4 performing various output functions. As shown in FIG. 2, the input detecting block A1 and the response outputting block A4 include the MIDI interfaces A1*m* and A4*m*, respectively, which will be connected to the electronic musical apparatus EM or MD preferably by wireless in the case the musical interaction assisting apparatus PA is of a robot type or another separate type. The interpreting block A2 and the response generating block A3 operate with the aid of the interpretation database A5 and the learning database A6 comprised of storage devices, respectively.

The musical interaction assisting apparatus PA further comprises an operation setting device A7 for setting the mode of operation and the music to be performed. There are several modes of operation prepared in the musical interaction assisting apparatus PA such as a solo player mode, a band member mode, a lesson teacher mode and a music-mate mode. Where the musical interaction assisting apparatus PA is of a robot type, it further comprises a traveling mechanism (e.g. a walking mechanism in the case of a walking robot), a contact detecting device for detecting a contact with another apparatus such as an electronic musical apparatus EM or MD, and various other detecting mechanisms in connection with the travel of the assisting apparatus PA (not particularly shown in the Figure).

(1) Input Detecting Block A1 and Input Interpreting Block A2

The input device A1 is provided for inputting various information relating to the user's (player's) action and includes an acoustic input detector A11, a visual input detector A12, a physical input detector A13 and an electronic input detector A14. The input information as detected by the respective input detectors A11-A14 is interpreted in the input interpreting device A2 through the data processing therein. The acoustic, visual and physical input detectors A11-A13 are to input the action information respectively representing the user's actions acoustically, visually and physically into the musical interaction assisting apparatus PA.

More specifically, the acoustic input detector A11 includes a microphone as the input detector for detecting acoustic inputs such as the user's voices, handclaps, and percussive sounds, wherein the acoustic action information detected by the microphone is then transmitted to the input interpreting device A2 for sound and speech recognition and interpretation processing so that the words, calls, music or noises are recognized and interpreted in meaning. For example, with respect to words, the registered key words and other onomatopoeic or mimetic words are recognized and interpreted to thereby judge the user's intentions and emotions based on the results of the sound recognition. With respect to music, the tone pitches, the tone colors, the tone pressures (volume level), the tempo or the music piece (work) can be recognized and interpreted. There may be also provided a function of comparing the user's performance with the exemplary performance. With respect to handclaps or percussive sounds, the tone color or the number or oftenness of the inputted sounds may tell which one of the predetermined signs.

The visual input detector A12 includes a camera as the input detector for detecting visual inputs such as the user's image or figure, wherein the visual action information detected by the camera is then transmitted to the input interpreting device A2 for image recognition and interpretation processing so that the user's eye movement, behavior, facial expression or gesture action (sign) will be recognized. The interpreting device A2 may also be designed to identify an individual person from characteristic features of the face or the body of the user. The camera may preferably be positioned facing straight toward the user operating the musical interaction assisting apparatus PA. For example, in the case where the musical interaction assisting apparatus PA is of a robot type, the camera may be placed near the eyes of the robot. Where the musical interaction assisting apparatus PA is built in a parent apparatus having a display device, the camera may be placed just above the display device. Generally in the case of a separate body type, the camera may be placed at a position in the front face of the body or console of the musical interaction assisting apparatus PA.

The physical input detector A13 includes a touch sensor, a vibration sensor, an acceleration sensor, an angular velocity sensor, a temperature sensor, or else as the input detector for detecting physical inputs such as the user's operation and the physical movement of the musical interaction assisting apparatus PA, wherein the physical action information detected by such sensors is then transmitted to the input interpreting device A2 for recognition and interpretation of the user's touching, shaking, tapping, lifting, and so forth.

The electronic input detector A14 includes the MIDI input receiver A1*m* (MIDI input terminal), a radio frequency (RF) ID detector, etc. as the input detector for detecting electronic inputs such as music performance MIDI signals from the electronic musical apparatus EM or MD and electronic information about the user. The input interpreting device A2 recognizes and/or evaluates the music based on the user's performance signals from the electronic musical apparatus EM as inputted through the MIDI input receiver A1*m* or authenticates an individual based on the RFID personal information as detected by the RFID detector.

The input interpreting device A2 comprises various recognition engines, which conduct various recognition processing to interpret (recognize) the respective input information inputted through the input detecting device A1 and to generate the necessary recognition (judgment) information by making reference to the interpretation database A5 during the recognition processing. The interpretation (recognition) database A5 includes information registered beforehand as well as information occasionally registered by the user thereafter, wherein the architecture of the interpretation (recognition) algorithm as well as of the interpretation (recognition) database can be selected and employed from among the known technology.

(2) Response Generating Block A3

The response generating device A3 is provided for generating information to control or drive the electronic musical apparatus EM as well as information to give acoustic, visual or physical responses to the user based on the interpretation (recognition) results by the input interpreting device A2. In the course of generating such information, reference may be made to the learning database A6. The learning database A6 may preferably be prepared separately for separate operation modes of the musical interaction assisting apparatus PA.

(3) Interactive Response Output Block A4

The interactive response output device A4 includes an acoustic response output device A41, a visual response output device A42, a physical response output device A43 and the MIDI output transmitter A4*m*. The respective output devices A41-A43 are for giving acoustic, visual and physical interactive responses to the user based on the response information generated by the response generating device A3.

More specifically, the acoustic response output device A41 has functions of giving spoken messages in words or nonverbal beep sounds via a loudspeaker based on the acoustic response information generated by the interactive response generating device A3. The acoustic response output device A41 may optionally be provided, when necessary, with a musical tone producing function, for example by further including a tone generator circuit 8 and an effect circuit 9 as in the electronic musical apparatus EM of FIG. 1, so that musical sounds can be emitted through a loudspeaker. The interactive acoustic response may be a mere response to the inputted action information and may be a further response prompting the user to input a further action information subsequent to (and in addition to) the already inputted action information.

The visual response output device A42 outputs visual responses based on the visual response information generated by the interactive response generating device A2. For example, in the case where the musical interaction assisting apparatus PA is of a robot type, the interactive visual responses may be by the movement of the robot including gestures of waving the hand (paw in the case of an animal robot), shaking the head or waggling the neck, dancing, facial expressions and eye movements, whereby the interactive responses are given to the user. In the case where the musical interaction assisting apparatus PA is another type of separate machine or a type incorporated in a parent apparatus, the interactive responses will be given to the user by displaying images on a display screen equipped in the musical interaction assisting apparatus PA.

The physical response output device A43 outputs physical responses based on the physical response information generated by the interactive response generating device A3. For example, the interactive physical response may be a temperature change such as by heating or cooling the musical interaction assisting apparatus PA by means of a temperature control module such as a thermoelectric element. In the case of a robot type the response can be by a touch or a vibration given to the user such as tapping and patting.

The MIDI output transmitter A4*m* outputs musical control signal generated by the response generating device A3 in the format of the MIDI protocol to the electronic musical apparatus EM or MD (this outputted signal is herein referred to as "MIDI control signal"). The MIDI control signal outputted from the MIDI output transmitter A4*m* includes information relating to the musical performance (like channel messages), information indicating the operation of the controls by the user (like switch remote messages), information for controlling the musical apparatus EM or MD (like system exclusive messages) and other information (like bulk data).

Example of Operation in Solo Player Mode

Description will be made hereinafter about specific operations with an example of the musical interaction assisting apparatus of a robot type conducting a sequence of musical interaction assisting operations in a solo player mode. The solo player mode as established with the aid of the musical interaction assisting apparatus PA is set by the user's setting of the mode of the operation on the operation setting device A7, in which the music to be performed and the tempo thereof are also set beforehand. The set conditions are transmitted to the electronic musical apparatus EM or MD via the MIDI output transmitter A4*m* at the time such conditions are set on the operation setting device A7.

(1) Introduction Performance

For example, as the user claps his/her hands toward the musical interaction assisting apparatus PA of a robot type, the input interacting device A2 recognizes and interprets the sound of the handclap inputted via the acoustic input detector A11 and the response generating device A3 generates a responsive voice signal saying "Beat time with your hands." to give to the user an audible instruction in voice via the acoustic response output device A41.

As the user beats time with his/her hands in response to the instruction, the input interpreting device A2 interprets and judges the tempo of the repeated handclaps in comparison with the previously set tempo. The response generating device A3 generates a voice signal saying "Beat faster." or "Beat more slowly." according to the judgment at the input interpreting device A2 and the acoustic response output device A41 gives such a voice instruction to the user. As the tempo of the user's beating comes close to or substantially equal to the set tempo, the acoustic response output device will say, "Thank you."

Simultaneously with this voice message "Thank you." from the acoustic response output device A41, the response generating device A3 generates a MIDI control signal to instruct the start of the music performance and the MIDI output transmitter A4*m* transmits the same to the electronic musical apparatus EM to cause the electronic musical apparatus to start the accompaniment performance and the music score display of the set music piece. Thus the electronic musical apparatus EM starts giving out the introduction part of the music piece audibly through the sound system 17, and the music score of the corresponding part is progressively displayed on the display device 16.

While the hand-clapping action triggers the start of the performance of the introduction of the music piece in the above example, the start of the introduction may be triggered by a whistle or a call. In the case where the introduction is started in response to a whistle, the user whistles to the musical interaction assisting apparatus PA and then the input interpreting device A2 interprets the whistle as detected by the acoustic input detector A11 and the response generating device A3 reacts to stand by for a response output expecting another whistle.

As the user repeats whistling several times, the response generating device A3 activates the acoustic response output device A41 in response to the repetitive recognition of the whistles by the input interpreting device A2 so that the acoustic response output device A41 starts humming the set music piece and also speaks "Let's sing together."

Then as the user whistles or hums the set music piece in ensemble and the input interpreting device A2 recognizes the ensemble state, the interactive response generating device A3 generates a MIDI control signal of instructing the start of the music piece performance and the MIDI output transmitter A4*m* transmits the same to the electronic musical apparatus EM, thereby causing the electronic musical apparatus EM to start the accompaniment performance and the score display of the set music piece. Accordingly, the introduction part of the music piece goes on sounding from the sound system 17 and the music score progresses on the screen of the display device 16.

Next in the case where the introduction part is initiated in response to a call, the musical interaction assisting apparatus PA of a robot type is given a nickname. As the user calls the nickname toward the apparatus robot PA, the input interpreting device A2 interprets the call as detected by the acoustic input detector A11 and the response generating device A3 reacts to stand by for a response output expecting another call by the nickname.

As the user repeats the call by the nickname, the response generating device A3 activates the acoustic response output device A41 in response to the repetitive recognition of the calls by the input interpreting device A2 so that the acoustic response output device A41 answers back to the user saying, "What? Is it a lesson time?" and further continuing, "If you want to have a lesson, please pat me." Then, as the user pats the apparatus robot PA, the action input interpreting device A2 interprets via the physical input detector A13 that the user patted the robot apparatus PA.

The interactive response generating device A3 then generates a speaking signal in response to the recognition of the patting action of the user so that the acoustic response output device A41 say, "Thank you." and the response generating device A3 further drives the traveling mechanism (not shown) to move the body of the assisting apparatus PA near to the electronic musical apparatus EM.

When the musical interaction assisting apparatus PA touches some part of the electronic musical instrument EM and a touch sensor (not shown) included in the physical input detector A13 detects the touch, the response generating device A3 causes the traveling mechanism to stop moving and simultaneously generates a MIDI control signal to instruct the start of the music performance and the MIDI output transmitter A4*m* transmits the same to the electronic musical apparatus EM to cause the electronic musical apparatus to start the accompaniment performance and the music score display of the set music piece. Thus the electronic musical apparatus EM starts giving out the introduction part of the music piece audibly through the sound system 17, and the music score of the corresponding part is progressively displayed on the display device 16.

(2) Melody Performance

The progress of the introduction performance by the electronic musical instrument EM is monitored by the input interpreting device A2 through the MIDI input receiver A1*m*, and as the performance of the introduction progresses near to its end, i.e. the point where the first melody (melody A) will start, the response generating device A3 causes the acoustic response output device A41 to say, "Start the melody." thereby commanding the user to start playing the melody part of the music piece on the electronic musical apparatus EM.

As the user start playing the melody part in response to such a command, the electronic musical-apparatus EM advances the accompaniment performance into the accompaniment for the melody and displays the music score of the running portion of the music piece. Further, the visual response output device will move (wag) the head or the tail of the robot apparatus PA. On the other hand, if the MIDI input receiver A1*m* does not receive a MIDI signal of a performance by the user and the input interpreting device A2 judges that the user has not started a performance of the melody, the response generating device A3 will give a MIDI control signal instructing the electronic musical apparatus EM a temporary stoppage of the musical performance through the MIDI output transmitter A4*m*. When the user starts the melody performance, the stoppage instruction will be cleared. In this manner, the electronic musical apparatus EM is in the standby state for the performance of the music piece until the user starts playing the melody, and as the user starts playing the melody, the electronic musical apparatus EM goes forward to perform the accompaniment for the melody and display the music score with the head and the tail wagging.

While the user keeps on the melody performance on the electronic musical apparatus EM, the input interpreting device A2 judges the skill of the user's melody performance from the MIDI input receiver A1*m* periodically for every predetermined span (e.g. one measure) of the music progression, and the response generating device A3 accordingly generates a speech signal saying, "Good job." or "Keep going." to cheer up the user by the verbal message through the acoustic response output device A41. When the user's melody performance comes to the finish, the input interpreting device A2 makes a general evaluation of the user's melody performance through all the spans so that the response generating device A3 generates a message like, "Your melody performance was very good." based on the general evaluation, which message will be given to the user verbally through the acoustic response output device A41.

(3) Performance by Musical Interaction Assisting Apparatus PA

The musical interaction assisting apparatus PA may be so designed that where the user plays a certain length of phrase in the progression of a music performance and gives a break from time to time, the assisting apparatus PA will present a performance of the same phrase interactively to be friendly to the user. For example, when the input interpreting device A2 judges that the user has played a length of phrase and stopped, the response generating device A3 will cause the acoustic response output device A41 to say, "Now it is my turn." and move the musical interaction assisting apparatus PA itself to the front of the keyboard of the electronic musical apparatus EM and cause the visual response output device A42 to mimic the hand and arm movements in the musical performance, simultaneously driving the electronic musical apparatus EM via the MIDI output transmitter A4*m* to give a performance of the same phrase in a bit more awkward manner according to a previously prepared performance data file.

In other words, the musical interaction assisting apparatus PA repeats the user's performance, but in a poorer manner. Then the acoustic response output device A41 says, for example, "You are better at playing than I am. I would like to know how to play. Tell me how." and drives the electronic musical apparatus EM via the MIDI output transmitter A4*m* to present the accompaniment for the same melody portion.

Then, as the user plays the same phrase again on the electronic musical apparatus EM to the presented accompaniment, the input interpreting device A2 analyzes the user's playing via the MIDI input receiver A1*m* and the response generating device A3 in turn stores the analyzed results of the user's playing into the learning database A6. The response generating device A3 causes the acoustic response output device A41 to give out a message "Thank you." and causes the electronic musical apparatus EM to give a musical performance which traces the user's performance according to the data file stored in the learning database A6, and further causes the acoustic response output device A41 to say, "Did I play as good as you did?" and drives the electronic musical apparatus EM via the MIDI output transmitter A4*m* to play the accompaniment of the following portion to advance the music progression forward.

Examples of Data Processing of Input Interpretation and Response Generation

Hereinafter will be made a description about characteristic data processing in other modes than the solo player mode in connection with the data handled in the input interpreting device A2 and the response generating device A3 in the case of a robot type musical interaction assisting apparatus PA.

(A) Band Member Mode (A-1) Where the mode operation of the musical interaction assisting apparatus PA is set to be a band member mode by the operation setting device A7, the prerequisite condition for initiating the operation in this mode is that the eyes of the user are directed toward a predetermined direction (e.g. to the eyes of the musical interaction assisting apparatus PA), i.e. eye contact is kept between the user and the assisting apparatus PA.

The input interpreting device A2 recognizes and interprets that the user's eyes are directed to the predetermined direction (for eye contact) according to its function of recognizing the eye movement of the user based on the image of the user supplied from the visual input detector A12. Then as the user makes ticking sounds using the drum sticks, the acoustic input detector A11 detects the same and the input interpreting device A2 recognizes the ticking sounds of the drum sticks according to the programmed algorithm. The response generating device A3 then generates and transmits a MIDI control signal which instructs the start of the music performance to the electronic musical apparatuses EM and MD via the MIDI output transmitter A4*m* so that the electronic musical apparatus EM will start the accompaniment performance of the music piece set in the electronic musical apparatus EM beforehand and command the user to play the predetermined part (e.g. a melody part) on the electronic musical apparatus EM and so that the other electronic musical apparatus MD will start the performance of another part of the same music piece.

(A-2) During the above ensemble, if the user whose eye contact has already been made by the eye movement recognition shows a predetermined gesture (sign) indicating the finish of the solo part performance, the input interpreting device A2 understands the sign of the solo part ending by means of image recognition via the visual input detector A12, and the response generating device A3 transmits a MIDI control signal which instructs a shift of the performance part to the other electronic musical apparatus MD via the MIDI output transmitter A4*m* so that the performance part on the other electronic musical apparatus MD will be shifted to the next predetermined part.

(A-3) Further, if the user whose eye contact has already been made by the eye movement recognition shows a predetermined gesture (sign) indicating the prolongation of the ending portion, the input interpreting device A2 interprets this gesture by means of image recognition via the visual input detector A12, and the response generating device A3 transmits a MIDI control signal which instructs a prolongation of the ending portion to the electronic musical apparatuses EM and MD via the MIDI output transmitter A4*m* so that the sounding of the note (s) at the ending portion will be prolonged with a fermata.

(B) Lesson Teacher Mode (B-1) Where the mode operation of the musical interaction assisting apparatus PA is set to be a lesson teacher mode by the operation setting device A7, then as the user (a student) gives a musical performance on the electronic musical apparatus EM, the input interpreting device A2 compares the user's performance inputted via the acoustic input detector A11 with the model performance, for example, stored in the interpretation database A5 to judge the degree of the user's performance skill, and the response generating device A3 will then tell the user a verbal message about the judgment via the acoustic response output device A41. In this case, the performed contents of the student on the electronic musical apparatus EM may be the MIDI performance data and may be inputted electronically via the MIDI input receiver A1*m* through the MIDI interface 11 as mentioned before.

(B-2) From the images of the student (user) as detected by the visual input detector A12 or from the voices of the student (user) as detected by the acoustic input detector A11, the input interpreting device A2 judges the student's behavior (or actions) and/or emotions using the image recognition algorithm and/or the voice recognition algorithm, and the response generating device A3 will tell a verbal message about the judgment via the acoustic response output device A41 and/or the visual response output device A42.

(B-3) When the input interpreting device A2 judges that the student is not at music performance based on the image of the student as inputted from the visual input detector A12 or on the MIDI signal as inputted from the MIDI input receiver A1*m*, the response generating device A3 will tell a verbal message to prompt the student to engage himself/herself in music performance via the acoustic response output device A41 and/or the visual response output device A42.

(C) Music-Mate Mode (C-1) In the music-mate mode of the musical interaction assisting apparatus PA, the user's music performance as inputted from the acoustic input detector A11 or the MIDI input receiver A1*m* is analyzed by the input interpreting device A2, and the analyzed habitual ways (manners) of the user are stored in the learning database A6. When the user performs the next time, the musical interaction assisting apparatus PA generates MIDI performance signals imitating the user's performance with reference to the habitual ways of the user read out from the learning database A6 and transmits the MIDI performance signals via the MIDI output transmitter A4*m* to the electronic musical apparatus EM for a musical performance imitating the user's.

Various Modifications

While particular preferred embodiments of the invention have been described with reference to the drawings, it should be expressly understood by those skilled in the art that the illustrated embodiments are just for preferable examples and that various modifications and substitutions may be made without departing from the spirit of the present invention so that the invention is not limited thereto, since further modifications may be made by those skilled in the art, particularly in light of the foregoing teachings. For example, specific operations have been described mainly with respect to the musical interaction assisting apparatus PA of a robot type, but the responsive movements of the robot such as gestures of wagging the head or the hands and arms (paws), dances, facial expressions and eye movements may be substituted by moving pictures (image movements) displayed on a display screen in the case of a musical interaction assisting apparatus PA integrally built in a musical apparatus EM or of a separate type.

Further, in the case of the built-in type, the MIDI input receiver A1*m* and the MIDI output transmitter A4*m* may be internal functional blocks in the electronic musical apparatus EM or MD handling the MIDI data or similar data. Namely, the data format used in the electronic musical apparatus may not be limited to the MIDI format but may be another similar format.

While the illustrated embodiment comprises an input detecting device including an acoustic input detector, a visual input detector, a physical input detector and an electronic input detector and an interactive response output device including an acoustic response output device, a visual response output device and a physical response output device, the input detecting device may include at least one of such input detectors and the interactive response output device may include at least one of such output devices.

It is therefore contemplated by the appended claims to cover any such modifications that incorporate those features of these improvements in the true spirit and scope of the invention.

What is claimed is:

1. A musical interaction assisting apparatus configured to be operatively connected to an electronic musical apparatus, the musical interaction assisting apparatus comprising:

an input device for inputting action information from user with the user's eye contact with the input device and the users sound expression or visual expression;

an interpreting device for recognizing the user's eye contact with the input device and the user's sound or visual expression input via said input device;

a response generating device for generating an interactive response signal based on the recognized sound or visual expression of the user making eye contact with the input device;

an interactive response output device for outputting, based on the interactive response signal, a musical performance control signal to the electronic musical apparatus to instruct start of musical performance on the electronic musical apparatus or control progression of musical performance on the electronic musical apparatus; and a physical response output device for outputting, based on the interactive response signal, physical response to the user, including at least one of temperature change, touching, or patting felt by the user.

2. A musical interaction assisting apparatus as claimed in claim 1, wherein said musical interaction assisting apparatus is incorporated in said electronic musical apparatus.

3. A musical interaction assisting apparatus as claimed in claim 1, wherein:

said input device includes a camera for visually detecting the user's eye contact and visual expression; and said interpreting device interprets the detected visual expression as any of an eye movement, a behavior, a facial expression, or a gesture of the user.

4. A musical interaction assisting apparatus as claimed in claim 1, wherein said input device inputs a predetermined sound expression from the user making eye contact with the input device, and said interactive response output device outputs the electronic response signal for instructing the electronic musical apparatus to start a musical performance.

5. A musical interaction assisting apparatus as claimed in claim 1, wherein the controlling progression of musical performance includes shifting a performance part to another part or prolongs an ending of the musical performance.

6. A computer readable medium storing a computer program for an electronic musical apparatus having an input device for inputting action information from user with the user's eye contact with the input device and the users sound expression or visual expression, the computer program containing instructions for:

recognizing the user's eye contact with said input device and the user's sound or visual expression input via said input device;

generating an interactive response signal based on the recognized sound or visual expression of the user making eye contact with the input device;

outputting a musical performance control signal, based on the interactive response signal, to the electronic musical apparatus to instruct start of musical performance on the electronic musical apparatus or control progression of musical performance on the electronic musical apparatus; and controlling a physical response output device to output, based on the interactive response signal, physical response to the user, including at least one of temperature change, touching, or patting felt by the user.

* * * * *